United States Patent [19]

Worger et al.

[11] Patent Number: 4,866,713
[45] Date of Patent: Sep. 12, 1989

[54] OPERATIONAL FUNCTION CHECKING METHOD AND DEVICE FOR MICROPROCESSORS

[75] Inventors: William R. Worger, Mesa; Gerald V. Piosenka, Scottsdale, both of Ariz.

[73] Assignee: Motorola, Inc., Schaumburg, Ill.

[21] Appl. No.: 115,483

[22] Filed: Nov. 2, 1987

[51] Int. Cl.⁴ .......................................... G06F 11/00
[52] U.S. Cl. ................................... 371/16.3; 371/62; 371/25.1
[58] Field of Search .................... 371/38, 51, 62, 16

[56] References Cited

U.S. PATENT DOCUMENTS

| | | | |
|---|---|---|---|
| 4,211,997 | 7/1980 | Rudnick et al. | 371/38 |
| 4,355,393 | 10/1982 | Kubo et al. | 371/51 |
| 4,586,180 | 4/1986 | Anders et al. | 371/62 |
| 4,593,393 | 6/1986 | Mead et al. | 371/38 |
| 4,627,060 | 12/1986 | Huang et al. | 371/62 |
| 4,727,549 | 2/1988 | Tulpule et al. | 371/62 |

Primary Examiner—Charles E. Atkinson
Attorney, Agent, or Firm—Jordan C. Powell; Maurice J. Jones

[57] ABSTRACT

An operational function checking method and device for a microprocessor, which uses four circuits to verify that a microprocessor and processing system are operating properly.

8 Claims, 2 Drawing Sheets

OPERATIONAL FUNCTION CHECKING METHOD AND DEVICE FOR MICROPROCESSORS

This invention was made with Government support under MDA904-85-C-8030 awarded by Maryland Procurement Office (NSA). The Government has certain rights in this invention.

BACKGROUND OF THE INVENTION

The present invention pertains to a device and method for providing a single microprocessor based control architecture which provides an inherent self-test capability of sufficient rigor to insure that the structure is free of critical failures.

In recent years, microprocessors have begun to be used in almost all sectors of electronic equipment design. This trend has evolved because the microprocessors are versatile, low-cost, easy-to-use and powerful. There are many areas of electronics which have not been able to utilize microprocessors. These areas include command and control applications which require extreme reliability or the ability to detect and inhibit improper operation of the system or a critical portion of the system. The general difficulty stems from the self-contained nature of a microprocessor which makes it very difficult to determine, via self-test, whether the processor and its associated support devices (RAM, ROM, etc.) are operating properly.

A previous solution to this problem has been to design two completely separate microprocessor systems which execute identical programs concurrently and verify proper operation via comparison techniques on selected outputs of the two systems. This method has significant drawbacks including the expense of duplicating all the functions of the system including the microprocessor, RAM, ROM, and input/output functions plus the cost and complexity of comparison circuitry. Another difficulty with duplicating processors is the problem of synchronization of the two microprocessors. The microprocessors must be synchronized so that the compared outputs of the two systems occur at the exact same time. If they do not occur simultaneously, the comparison logic will declare an error. Therefore, circuitry must be provided to insure the synchronization of the microprocessors. Adequate precautions must also be taken to provide immunity to powerline transients.

SUMMARY OF THE INVENTION

The present invention relates to a method and device for monitoring and verifying the correct operation of a microprocessor system. The invention uses four circuits to perform the checking functions. These circuits are a parallel cyclic redundancy checker (CRC) to monitor address and data lines of the microprocessor, a simple watchdog timer to verify proper response to a powerup sequence, an exact execution time watchdog timer to verify proper microprocessor execution time and a parity ROM to be used in conjunction with the program ROM to verify that the program ROM is providing valid data to the microprocessor.

An object of the present invention is to provide a new and improved device and method for checking the operational functioning of a microprocessor and related system.

A further object of the present invention is to provide a single microprocessor based control architecture which provides an inherent self-test capability of sufficient rigor to insure that the structure is substantially free of failures.

A further object of the present invention is to provide a device and method for checking a microprocessor and a microprocessor system without duplicating substantial portions of the electronics associated with the processor.

DESCRIPTION OF THE PREFERRED EMBODIMENT

Figure 1:
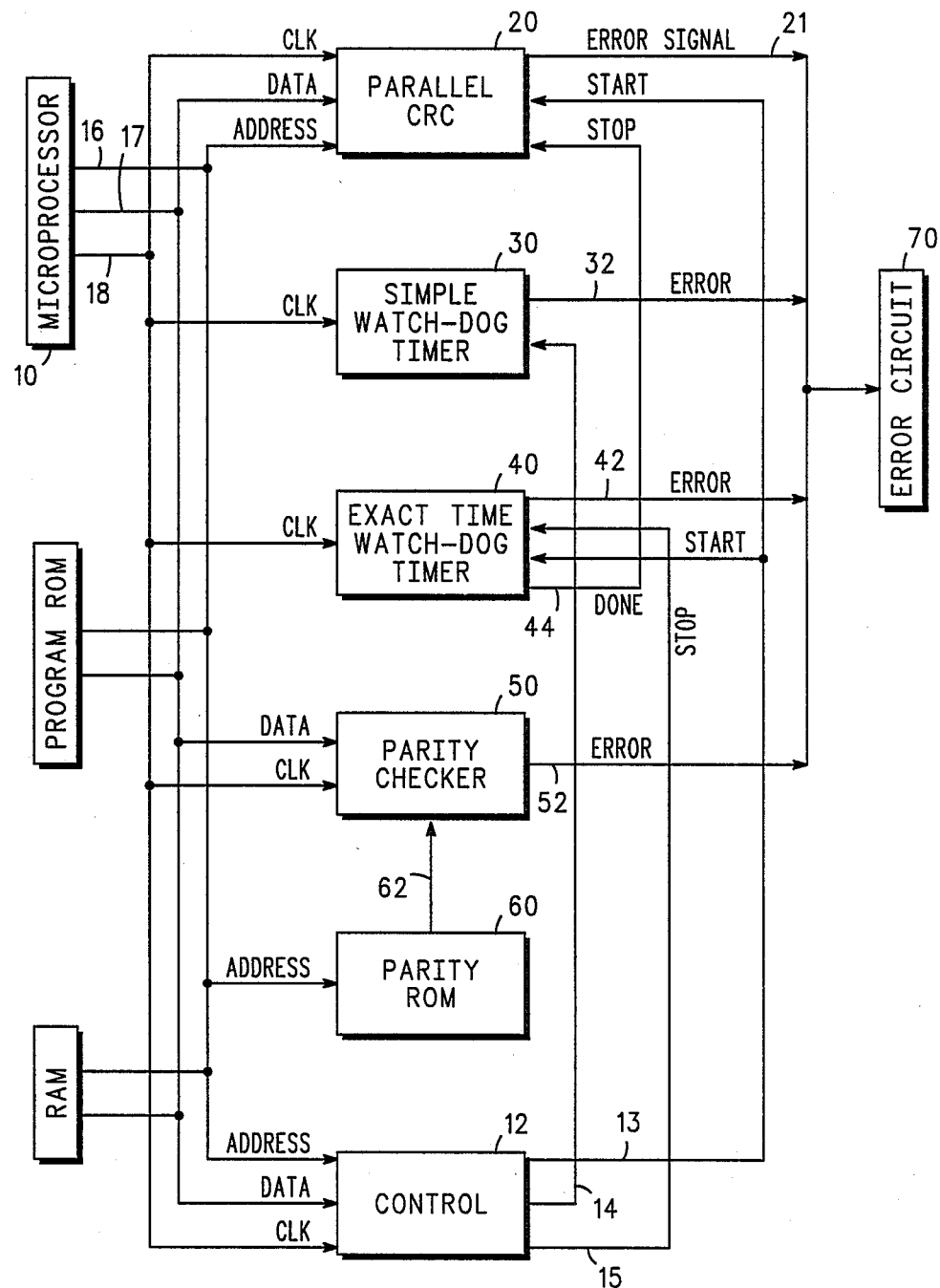
FIG. 1 is a simplified block diagram illustrating an embodiment of the present invention.

Referring now to the drawings, FIG. 1 is a simplified block diagram of an operational function checking device 8 for checking correct initialization at power-up, correct execution sequence, correct execution timing, and correct instruction performance functions of a microprocessor embodying the present invention. FIG. 1 illustrates a control circuit 12 which is shown separate from a microprocessor 10, but which may actually be part of microprocessor 10. That is, microprocessor 10 may supply the control impulses needed. Control circuit 12 may be a simple latch that microprocessor 10 can write to and which may utilize one or more bits to provide instructions. Control circuit 12 has inputs coupled to an address bus 16, a data bus 17 and a clock 18 of microprocessor 10 and has a start output 13, a reset output 14, and a stop output 15.

A parallel Cyclic Redundancy Checker (CRC) 20, having error output 21 coupled to an error logic circuit 70, is coupled to address bus 16, data bus 17, and clock 18 of microprocessor 10. Parallel CRC 20 has a stop input which is further coupled to output 44 or exact time watchdog timer 40.

A simple watchdog timer 30, having an error output 32 coupled to error logic circuit 70, is coupled at inputs thereof to clock 18 of microprocessor 10 and reset output 14 of control circuit 12.

An exact time watchdog timer 40, having an error output 42 coupled to error logic circuit 70 and a done output 44 coupled to a stop input of parallel CRC 20, is coupled to clock 18 of microprocessor 10 and has a start input which couples to start output 13 and a stop input which couples to stop output 15 of control circuit 12. It should be understood that done output 44 and stop input of CRC 20 are the same coupling line with the input and output names representing functions performed by the respective line. Similarly, stop input of exact time watchdog timer 40 and stop output 15 of control circuit 12 are the same coupling line with different function labels.

A parity checker 50, having an error output 52 coupled to error logic circuit 70, is coupled to data bus 17 and clock 18 of microprocessor 10. A parity ROM 60, has a parity output 62 coupled to a parity input of parity checker 50, and an address input coupled to address bus 16 of microprocessor 10.

It will be understood by those skilled in the art, that clock 18 of microprocessor 10 may also be called a control line, and is present in all processors and sets the frame of reference and validates the information supplied by the processor. Timers 30 and 40 use clock 18 to count the clock transition for each instruction cycle.

Further, it will be understood by those skilled in the art, that error logic circuit 70 is a circuit which becomes active when an error is detected in processor 10. Thus, error logic circuit 70 may, in a simple example, represent a device which performs a logical OR function. Error logic circuit 70 may signal an error, or it may be set to disable the whole system (not shown) or switch to a secondary system (not shown) when an error is detected. Accordingly, error logic circuit 70 may have varied responses dependent upon the application of the processor.

Parallel CRC 20 is used to accumulate a CRC on data and address busses 17 and 16, respectively, while microprocessor 10 is executing its program. Parallel CRC 20 is run for a given number of processor cycle times and then the result of the CRC accumulated is compared in parallel CRC 20 to a known value which is either stored in memory by the program or is stored in ROM during manufacture of the present invention.

The CRC checking, the generation of the stop signal and the comparison between the correct CRC and the actual CRC are all done in hardware outside the microprocessor since it is not known that microprocessor 10 is operating correctly. If operating incorrectly, microprocessor 10 could not be relied upon to produce accurate results.

Parallel CRC 20 creates a signature analysis which consists of all the states of address line 16 and all of the states of data line 17. This signature is then compared to a previously predetermined signature to verify that the states of address lines 16 and data line 17 contain the proper information and that the information appears in the proper sequence. This check verifies that microprocessor 10 is executing the program instructions in the proper sequence.

By executing each instructions of microprocessor 10 and writing the results of the instructions to an address in the memory space, parallel CRC 20 will verify that all of the instructions that the microprocessor can perform are being executed correctly. For example, if the program is written so that all of the math operations that microprocessor 10 is capable of performing are used with constant data as their inputs and if the output is written to the memory space, parallel CRC 20 will monitor the write of the result to the memory and, if the result is wrong, the CRC will be wrong. Another example is the testing of the jump instructions. If the program is written so that jumps are made throughout the ROM memory space, if a particular jump is performed incorrectly, the CRC result will be wrong and the CRC test will fail.

Thus, parallel CRC 20 is used to verify that the instructions within a given piece of code are being read properly from the ROM or RAM, that the program flow is proceeding properly and that the information being written to memory is correct.

Figure 2:
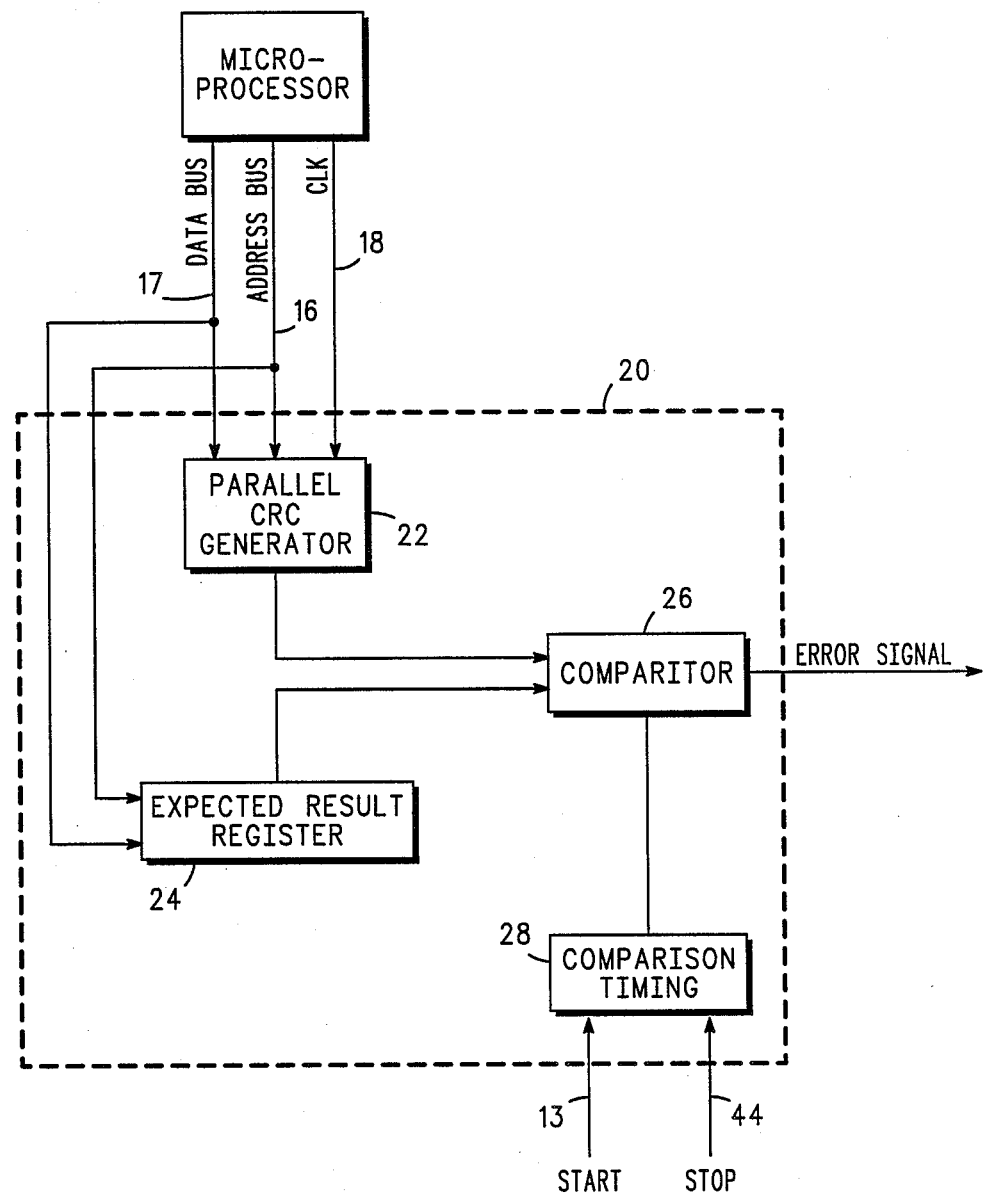
FIG. 2 is a simplified block diagram illustrating an embodiment of a parallel CRC used in the present invention.

FIG. 2 shows a simplified block diagram of parallel CRC 20. FIG. 2 illustrates an embodiment of parallel CRC 20 consisting of parallel CRC generator 22 coupled to data bus 17, address bus 16 and clock 18. CRC 20 additionally includes an expected result register 24 and a comparator 26 which has inputs coupled to parallel CRC generator 22 and expected result register 24. CRC 20 further includes a comparison timing circuit 28 having an output coupled to an input of comparator 26 and inputs coupled to start output 13 and done output 44. Expected result register 24 is used to store the expected results of the CRC generation. Expected result register 24 is loaded by microprocessor 10 before the CRC generation is started. Comparator 26 is used to compare the results stored in the expected results register 24 after the CRC check has been completed. Comparator 26 then generates an error if the actual results differ from the value stored in expected results register 24.

While using parallel CRC 20, it should be noted that data bus 17 and address bus 16 must be predictable. The execution of the program must result in the same address and data bus activity each time the test is run. This is necessary since the CRC test needs consistent data in order to perform the CRC the same each time. This implies that the program takes exactly the same branches each time the program is run, that the results of each of the calculations is exactly the same each time the program is run and that any memory which is read contains exactly the same data each time. These constraints prevent parallel CRC 20 from being used continuously to monitor microprocessor 10 unless microprocessor 10 is performing a constant task. In most applications, the CRC test is performed periodically as a "health check" on microprocessor 10 instead of being performed as a constant test. The particular application of microprocessor 10 will dictate the frequency at which the test should be performed. Referring again to FIG. 1, control circuit 12 sends a start signal via start output 13. Parallel CRC 20 is stopped by timer 40 via the done output 44 when a given program is completed. When CRC 20 receives the stop signal from done output 44, CRC 20 will compare the result with the expected result. If the two do not match, an error signal is produced by CRC 20 and sent to error logic circuit 70. It will be understood by those skilled in the art that the Parallel CRC generator 22 can create a CRC value which is dependent on all lines of data Bus 17 and address bus 16 at each clock period of clock 18. This can be accomplished without the need for a clock faster than clock 18 by performing the n steps (where n is the sum of the number of lines in data bus 17 and address bus 16) in parallel for each clock cycle of clock 18.

The CRC test can be used to verify the contents of a ROM, RAM or other storage device (not shown) utilized by microprocessor 10 by reading each location in the device during the CRC check. Reading each location of the device places the contents of the device on data bus 17 along with the address of the data. Parallel CRC 20 will then perform a CRC check on each of these pieces of data and create a resultant CRC value. This value can be stored as a signature of the particular piece of memory.

A second part of the microprocessor verification is accomplished by simple watchdog timer 30. This circuit is a timer which is run off of the system clock 18. Watchdog timer 30 is started by hardware when a reset signal to the microprocessor is detected. When the simple watchdog timer has been started, microprocessor 10 must restart the watchdog timer 30 before timer 30 reaches its final value. If the timer is not reset by microprocessor 10, it will time out and an error signal will be generated to error logic circuit 70.

Simple watchdog timer 30 is used to verify that microprocessor 10 has responded correctly to the power-on reset signal and that it is executing at least to the point where it can reset the timer. Simple watchdog timer 30 also performs a watchdog function on the various specific application functions performed by microprocessor 10. Since microprocessor 10 must restart timer 30 periodically, timer 30 will produce an error signal if microprocessor 10 misses the restart. In general, this missed restart is an indication that the processor is not operating correctly.

A third part of the processor verification test is exact time watchdog timer 40. Watchdog timer 40 is used to verify that microprocessor 10 is performing operations in the correct sequence and in the exact amount of time which it normally takes microprocessor 10 to execute the function. Exact time watchdog timer 40 is run off of clock 18 of microprocessor 10 so that it increments timer 40 each time microprocessor 10 executes another instruction. When timer 40 times out, it outputs a pulse on done output 44 which is one instruction cycle in length. Microprocessor 10 must match this pulse by writing to an I/O port at the exact time that the timer times out. In this preferred embodiment, control circuit 12 acts as the I/O port and outputs a stop instruction on stop output 15 to exact time watchdog timer 40. If the pulse from control circuit 12 does not occur at the exact same time as the stop signal from timer 40, there will be an error which indicates that the program was not executing the correct sequence or that microprocessor 10 is not executing instructions in the correct amount of time. In either case, the processor is not operating correctly and a signal goes out on error output 42 to error logic circuit 70.

A fourth part of the verification is a parity check on microprocessor 10's program ROM 50 FIG. 1. This parity check is accomplished by adding parity ROM 60 which extends the width of the program ROM by 1 bit. The contents of the parity ROM are then set to make the parity for each of the instructions in the program ROM odd parity. If the instruction read along with the 1-bit parity exhibits an even parity, then the hardware will generate an error message via error output 52 to error logic circuit 70.

This invention allows microprocessors to be used in situations where the ability to verify proper operation is critical. Further, since parallel redundancy microprocessor architecture is not needed, there is a great reduction in cost.

While we have shown and described specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. An operational function checking device for a microprocessor comprising:
   an error logic circuit;
   a parallel CRC having first and second inputs and an output said output of said parallel CRC coupled to said error logic circuit;
   an address bus of said microprocessor coupled to said first input of said parallel CRC;
   a data bus of said microprocessor coupled to said second input of said parallel CRC;
   a simple watchdog timer having an input and an output, said input coupled to a clock bus of said microprocessor, and said output coupled to said error logic circuit;
   an exact time watchdog timer having an input and an output, said input being coupled to said clock bus and said output being coupled to said error logic circuit; and
   a parity checker circuit with an input and an output, said input coupled to said address bus, said data bus, and said clock bus of said microprocessor and said output being coupled to said error logic circuit.

2. An operational function checking device as claimed in claim 1 wherein said parallel CRC futher comprises:
   a parallel CRC generator coupled to said data bus and said address bus, and an output;
   an expected result register coupled to said address bus and data bus, and said expected result register including an output; and
   a comparator having first and second inputs coupled to said outputs of said parallel CRC generator and said expected result register, respectively, and having an output coupled to said error logic circuit.

3. An operational function checking device as claimed in claim 2 wherein said parity checker circuit further comprises:
   a parity checker having first and second inputs and an output, said data bus of said microprocessor coupled to said first input, said second input coupled to said clock bus, and said error logic circuit coupled to said output; and
   a parity memory having an input and an output, said address bus from said microprocessor coupled to said input and said second input of said parity checker coupled to said output.

4. An operational function checking device for a microprocessor comprising:
   an error logic circuit;
   a control circuit coupled to an address bus and a data bus of said microprocessor and having first, second, and third outputs;
   a parallel CRC having first and second inputs each coupled to one of said data bus and said address bus, a third input coupled to said first output of said control circuit, a fourth input, and an output coupled to said error logic circuit;
   a simple watchdog timer having a first input coupled to said microprocessor, a second input coupled to said second output of said control circuit, and an output coupled to said error logic circuit;
   an exact time watchdog timer having a first input adapted to receive a clock input from said microprocessor, a second input coupled to said first output of said control circuit, a third input coupled to said third output of said control circuit, a first output coupled to the fourth input of said parallel CRC, and a second output coupled to said error logic circuit;
   a parity checker having a first input coupled to said data bus from said microprocessor, a second input, and an output coupled to said error logic means; and
   a parity memory having an input coupled to said address bus of said microprocessor, and an output coupled to said second input of said parity checker.

5. An operational function checking method for a microprocessor comprising the steps of:
   providing a microprocessor;

accumulating a cyclic redundancy check for data and addresses from said microprocessor over a given number of process cycles;

comparing accumulated CRC from said accumulating step with stored data;

signaling an error if said accumulated CRC and said stored data do not watch;

starting a simple watchdog timer;

sending a reset signal from said microprocessor to said simple watchdog timer before the counter reaches zero;

signaling an error if said reset signal is not sent before the counter reaches zero;

starting an exact time watchdog timer at the beginning of a processor operation, and counting each instruction cycle of said microprocessor stopping said exact time watchdog timer at a predetermined count;

sending a stop signal to said exact time watchdog timer from said microprocessor at substantially the same time the exact time watchdog timer stops;

signaling an error if said stop signal and the stopping of said count do not coincide;

appending a parity bit to memory which contains programs executed by the microprocessor;

programming the contents of the parity ROM so that the parity for each instruction contained in the program ROM have a predetermined parity; and signaling an error if a parity not equal to said predetermined parity is detected.

6. An operational function checking device for a microprocessor comprising:

CRC (cyclic redundancy checker) means coupled to the microprocessor to receive data, address, and clock information from said microprocessor;

simple watchdog timer means for checking a frequency of occurance of a reset signal from the microprocessor;

exact time watchdog timer means for checking a length of time required by the microprocessor for executing a given sequence of information;

parity check means;

error circuit means coupled to said CRC means, said simple watchdog timer means, said exact time watchdog timer means, and said parity means to receive an error signal from said simpled watchdog timer means, said exact timer watchdog timer means, and said parity means;

said error circuit means for signalling a microprocessor error when an error signal is received from at least one of said CRC means, said simple watchdog timer means, said exact time watchdog timer means, or said parity means;

said simple watchdog timer means and said exact time watchdog timer means coupled to the microprocessor to receive said clock information;

said parity check means coupled to the microprocessor to receive said data, address, and clock information from the microprocessor; and said exact time watchdog timer means coupled to said CRC means to relay an end of information sequence signal to said CRC means.

7. An operational function checking device for a microprocessor according to claim 6 wherein the operational function checking device further comprises a control circuit means for controlling the operation of the operational function checking device.

8. An operational function checking device for a microprocessor according to claim 6 wherein said CRC means comprises:

CRC generator means coupled to the microprocessor to receive said data, address, and clock information;

said CRC generator means for determining an information pattern from said received data;

expected results means for storing a predetermined information pattern;

comparitor means coupled to said CRC generator means to receive said information patten from said CRC generator means, and further coupled to said expected results means for receiving said predetermined information pattern from said expected results means;

said comparitor means for comparing said predetermined information patten with said received information pattern to determine whether an error has occured; and said comparitor means coupled to said error circuit means.

* * * * *